US010254745B2

(12) United States Patent
Cunney et al.

(10) Patent No.: US 10,254,745 B2
(45) Date of Patent: Apr. 9, 2019

(54) COMPUTER-IMPLEMENTED AUTOMATED DESIGN, MODELING AND MANUFACTURING SYSTEM FOR A PROJECT

(75) Inventors: Brendan Cunney, Blauvelt, NY (US); Michael Cunney, Pearl River, NY (US); Shaun Cunney, West Nyack, NY (US); Keith Pedrick, Saddle Brook, NJ (US); Joshua Whitman, Meadville, PA (US)

(73) Assignee: Mechanical Software Technologies, Inc., Meadville, PA (US)

( * ) Notice: Subject to any disclaimer, the term of this patent is extended or adjusted under 35 U.S.C. 154(b) by 1138 days.

(21) Appl. No.: 12/783,573

(22) Filed: May 20, 2010

(65) Prior Publication Data
US 2011/0288672 A1 Nov. 24, 2011

(51) Int. Cl.
G05B 19/4093 (2006.01)

(52) U.S. Cl.
CPC .......... *G05B 19/4093* (2013.01); *G05B 2219/35485* (2013.01); *G05B 2219/36225* (2013.01)

(58) Field of Classification Search
USPC ........................................ 700/104, 107, 182
See application file for complete search history.

(56) References Cited

U.S. PATENT DOCUMENTS

| 5,227,983 | A | * | 7/1993 | Cox ..................... G06F 17/509 434/72 |
| 5,517,428 | A | * | 5/1996 | Williams ............. G06F 17/509 700/83 |
| 5,557,537 | A | * | 9/1996 | Normann ............ G06F 17/5004 434/72 |
| 6,813,610 | B1 | * | 11/2004 | Bienias ....................... 705/26.5 |
| 6,922,701 | B1 | | 7/2005 | Ananian et al. |
| 6,968,298 | B2 | | 11/2005 | Lohmann et al. |
| 7,249,250 | B1 | | 7/2007 | Akasaka et al. |
| 7,689,386 | B1 | * | 3/2010 | Gates ..................... G06F 17/50 700/145 |
| 8,266,005 | B2 | | 9/2012 | Lopez et al. |
| 2003/0200062 | A1 | * | 10/2003 | Dessureault ........ G06F 17/5004 703/1 |
| 2005/0038636 | A1 | * | 2/2005 | Wakelam et al. ................. 703/1 |
| 2007/0198231 | A1 | | 8/2007 | Walch |
| 2008/0021823 | A1 | * | 1/2008 | Allin et al. ...................... 705/40 |
| 2009/0033656 | A1 | * | 2/2009 | Larkins et al. ................ 345/419 |

\* cited by examiner

*Primary Examiner* — Ryan A Jarrett
(74) *Attorney, Agent, or Firm* — Merchant & Gould P.C.

(57) ABSTRACT

A computer-implemented automated building mechanical systems design and modeling is described. The system provides a central source for all of the design and construction information for systems in a construction project in a coordinated two-dimensional and three-dimensional spatial database that is accessible as a means to produce automatically coordinated design development and construction document information of the mechanical systems. The system acquires and stores all of the appropriate design, engineering, and construction expertise information available for any building type for use in automatically assembling and coordinating the design, cost-estimating, and scheduling for the mechanical systems of the construction project. The system output model enables automatic generation of drawings and cost, manufacturing and scheduling information.

19 Claims, 2 Drawing Sheets

COMPUTER-IMPLEMENTED AUTOMATED DESIGN, MODELING AND MANUFACTURING SYSTEM FOR A PROJECT

BACKGROUND OF THE INVENTION

This invention relates generally to computer-aided design of building mechanical systems and, more particularly, to a system for enabling the computer-aided development of a design for building mechanical system elements, along with design development drawings, specifications, and cost and scheduling data associated with the design.

Demands for more expedient, more accurate design, cost, and schedule responses to clients' requests for new building and renovation work prompted the development of the invention described herein. Traditionally, architects, engineers, and contractors are pressured to respond ever more quickly to clients' requests for building designs, cost estimates, and construction schedules in connection with construction projects. In addition to needing to respond promptly to their clients requests for information and data, industry companies need to insure that such information and data is accurate. To remain competitive in today's marketplace, the industry also needs to dramatically reduce the time it takes to develop the requested information and data, as well as the overall project delivery time, at no expense to the quality of the project or the accuracy of the budget estimate.

Traditional drafting and computer-aided drafting ("CAD") techniques only serve to disseminate all of the information involved in designing and detailing a construction project and are time-consuming processes that require a high-level of interdisciplinary communication and management between architects, engineers, and contractors. What is missing from traditional design and construction processes is a means to quickly store, manage, and communicate all of the detailed knowledge and professional experience required by the various disciplines involved in the project in order to permit expeditious and extremely accurate estimates for the mechanical systems.

Therefore, what is needed is a computer-implemented automated modeling capability integrated with a computer integrated manufacturing environment within a single system.

SUMMARY OF THE INVENTION

One embodiment, accordingly, comprises a computer-implemented automated building mechanical system design, modeling and manufacturing system comprising: a spatial database; means for entering parametric objects wherein each of the parametric objects represents a construction component of a building being modeled and together the parametric objects describe information sufficient for assembly of a complete mechanical system model for manufacturing as constrained by the input of selected client or professional requirements, and further wherein each of the parametric objects includes an interface through which the parametric object communicates information with other parametric objects; an interface for input of project requirements to create an automated configuration of the mechanical system model; outputting the configuration of the mechanical system to a computer implemented manufacturing system or project management and accounting system.

In a preferred embodiment, the system acquires and stores all of the appropriate design, engineering, and construction expertise and information available for any building type for use in automatically assembling and coordinating the design, cost-estimating, and scheduling for a project. Such expertise and information includes design criteria, engineering formulas and calculations, manufacturer's specifications, subcontractors' and suppliers' information, city codes and regulations, materials specifications, and client requirements.

In one embodiment, the system consists of a plurality of objects, comprising elements arranged in an assembly hierarchy. Each of the objects includes programming code that defines an interface and discrete internal functions that define its behavior. The objects, or elements, are compiled into a set of libraries, which are then loaded into the spatial database. When instantiated in the database the objects automatically display appropriate graphical representations from different viewpoints to produce two- and three-dimensional views of the resultant model. Additionally, when instantiated in the database, the interfaces of the objects is determined to enable them to pass data between one another. Their internal functionality allows them to execute core functionalities of the database and internal functions of other objects in the model. These functionalities may include immovable structural components, preexisting conduits, barriers, wall and floor interfaces. Each of these definitions provides routing information for additional mechanical system design features.

Once the parameters are entered, as described above, the assembly process is initiated and run by executing the computer implemented system. This process continues autonomously until a complete model has been assembled in the spatial database from the appropriate library elements as constrained by the defined project parameters. As each element is placed its internal functions are executed and the system calculates the quantities of components and materials used and potentially the labor involved in its fabrication and installation. These quantities are passed directly to an estimate element where they are accumulated and priced for output either as a graphical estimate sheet in the database, or as the content of a transfer data file for passing to the cost estimating, manufacturing and scheduling systems.

The result of this complete process is that the design of the mechanical systems of a project, the production of the M.E.P. drawings, and the management of the fabrication process of mechanical system elements are all replaced by the automatic process and achieved from inputs of previously created structural, architectural computer aided drawing files. This automatic process encapsulates the knowledge and expertise of the designers and engineers, and the rules and codes of the construction industry specialists and regulatory bodies. It accepts the design requirements of the building owner, or customer, then automatically generates the appropriate building design in the form of a coordinated building model and generates the coordinated design documents necessary to construct the building. This automatic process is many thousands of times faster than the traditional methods. Such a dramatic decrease in production time brings with it huge reductions in cost by removing the need for teams of designers, engineers, estimators, drafters and managers, while delivering a more accurately coordinated set of design and production documents.

A technical advantage achieved with the invention is the speed and accuracy with which it delivers high quality information to members of the project team and to the client when required.

Another technical advantage achieved with the invention is the ability of the system to use fixed, non-parametric graphical objects as components of the model.

Another technical advantage achieved with the invention is the ability of the system to perform clash detection, or interference checking, as the model is being assembled and to automatically redesign the model to relocate the affected components and avoid a detected clash.

Another technical advantage achieved with the invention is that it generates an accurate, full-sized model in a computer by automatically assembling proprietary parametric objects encompassing generally available industry information into a coordinated, spatial database.

Yet another technical advantage achieved with the invention is that it enables the generation of any and all accurate coordinated design and construction drawings, details, specifications, shop drawings, cost estimates, and schedules for the project directly from the automatically assembled building model.

Yet another technical advantage achieved with the invention is that different data sets for implementing multiple design configurations may be input to the system along with incremental steps by which they are to vary. Assembly of all of the resultant models occurs automatically in sequence such that they can be compared and the optimum model selected. This process is referred to as "rattling the box" and enables multiple designs to be compared and evaluated and the optimum design to be selected there from.

Yet another technical advantage achieved with the invention is the reduction in delivery times resulting from the rapid production of the requisite documents, as well as the elimination of the many on-site redesign issues that typically occur during the construction of a building due to poorly coordinated information being generated at the design document stage.

Yet another technical advantage achieved with the invention is the increase in quality achieved in the design documents due in part to the guaranteed coordination of the information, as well as the time reduction and automation in the document production process, which enables many more drawings and details to be produced than would typically be feasible. This array of extra information helps deliver a far more complete document set, which in turn enables more efficient management of the construction process.

Still another technical advantage achieved with the invention is its ability to automatically generate a fully coordinated building design by encapsulating the knowledge and expertise of the designers and engineers, and the rules and codes of the construction industry specialists and regulatory bodies.

DETAILED DESCRIPTION OF A PREFERRED EMBODIMENT

Figure 1:
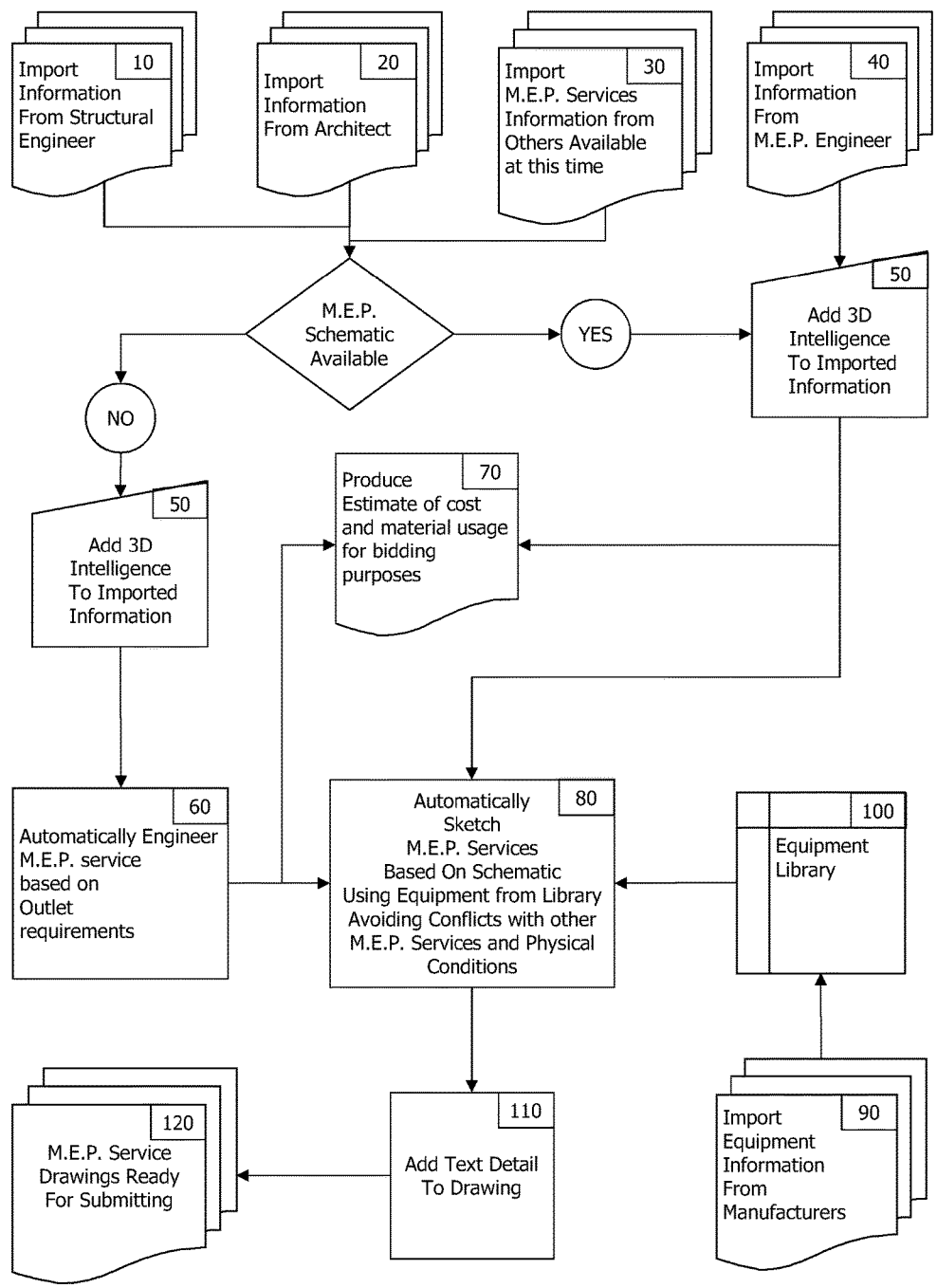
FIG. 1 is a block diagram of a computer environment for implementing the first stage 3-D rendering of the automated M.E.P services system embodying features of the present invention.
Figure 2:
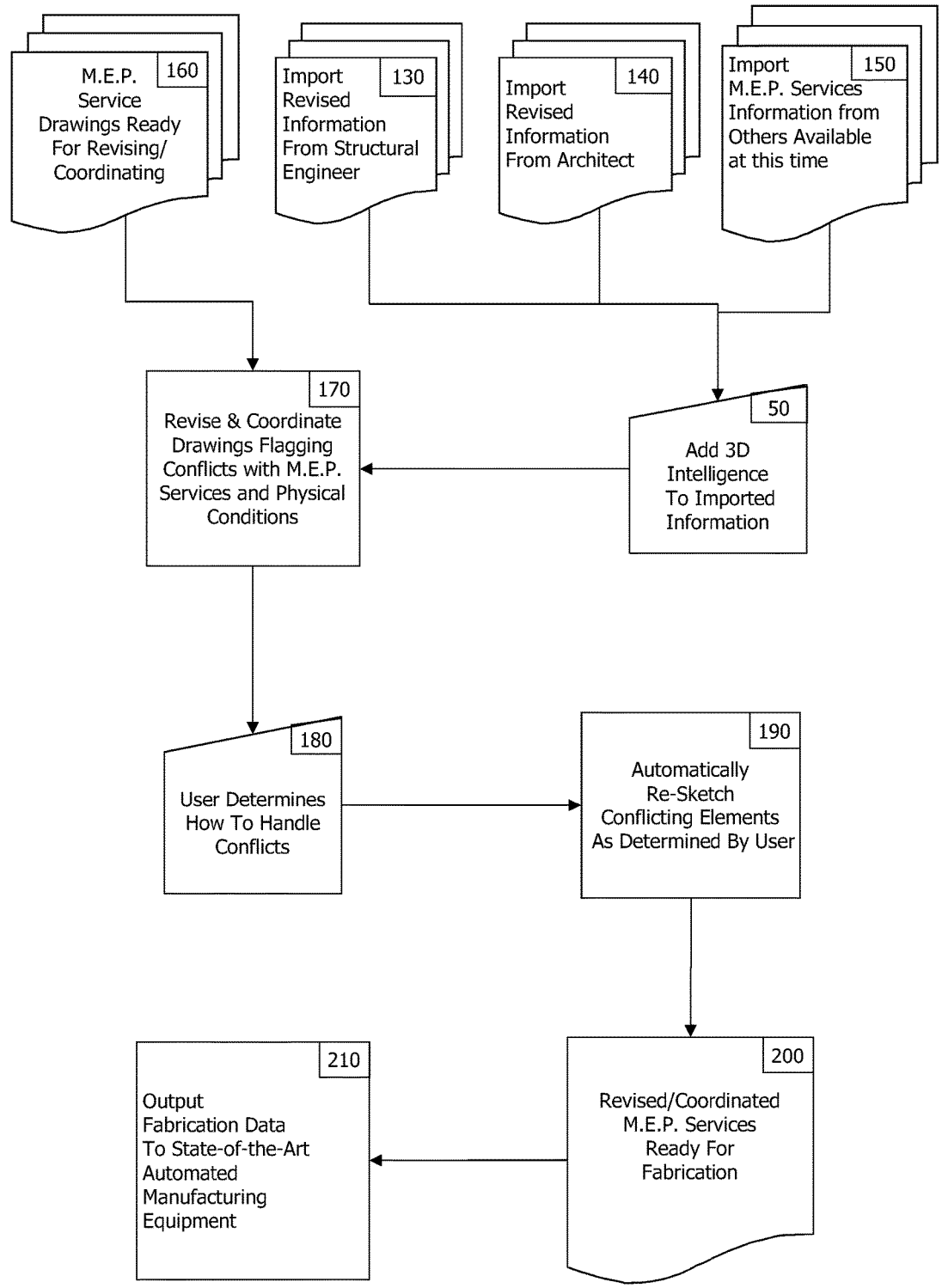
FIG. 2 is a block diagram of a computer environment for implementing the second stage revision and computer integrated manufacturing output embodying features of the present invention.

The figures illustrate a system block diagram of a computer environment for implementing the present invention. In a preferred embodiment, the environment comprises a single computer, for example, a desktop PC, a laptop PC, or a Unix workstation. Alternatively, the invention may be implemented on a network of such computers, in which case the environment comprises a server and a plurality of computers connected thereto in a conventional fashion via network connections. For purposes of illustration, it will be assumed herein that the environment comprises a single computer. As shown in the figures, software executable by a processor for implementing a plurality of systems, including an object-oriented parametric building modeler system, a design, modeling, estimation, and scheduling system, a cost estimating system, and a scheduling system, is stored on a hard drive (not shown) of the computer. It will be recognized that, in the case of a network implementation of the present invention, the software for implementing the systems will be stored on a server or equivalent thereof for access and execution by the various computers connected thereto. It will be further recognized that the software for implementing the systems may be stored on a web server or the like to enable Internet access to and use of the invention described herein. In the following preferred description like reference numbers indicate similar operations.

Imported information 10, 20, 30, 40 is obtained from various sources including structural engineers, architects, and/or mechanical, electrical, plumbing (M.E.P.) engineers. This imported information may be provided on paper and imported by a user or by optical reader. However, more frequently the information is proved in computer readable format and read directly from computer files generated by the various sources containing the necessary information.

While the below embodiment will be described in terms of a building and the corresponding mechanical system, the description is not intended to be limiting. For instance the imported information may also describe physical constraints of a room for furniture, cabinet or fixture design. In another instance the imported information may describe landscape, building or real estate boundaries for utility service, irrigation or septic design. In yet another instance the imported information may describe street, municipal or structures for city planning of utilities or streets. The imported information represents any constraints to routing, placement or flow of mechanical/electrical systems, furniture, fixtures, traffic, utilities or other structures within spatial confines. Such structures may include buildings or parks in communities affecting traffic or utilities or may include rooms in a building affecting mechanical system requirements such as air flow or movement of people from one place to another in the building or may include furniture or cabinet placement in a room to maximize space, storage or use.

At 10, structural information describing the physical conditions of the building's support structure is imported. The structural information may include but is not limited to building elements such as columns, beams and openings. At 20, architectural information describing the physical conditions of the building's floors, walls, ceiling, partitions, lights, doors, etc is imported. This information is stored such that changes to a particular member, be it a column, beam, opening, or the floors, walls, ceiling, partitions, lights, doors at one stage is reflected in all stages. This storage may be in the form of a database or as a 3-D model.

Imported M.E.P. Services 30 could describe existing conditions or other shop drawings of existing mechanical systems. This information may be available where an existing building is being retrofitted with new mechanical systems. Particularly, where the new systems will utilize some or all of the existing mechanical systems. Alternatively, at 40 M.E.P. information from an M.E.P. engineer may be provided. The M.E.P. engineer provides the desired routing of services. It can be appreciated that a combination of these may be used where existing mechanical systems exist and new, additional or changes to the mechanical systems are requested by the M.E.P. engineer.

Adding 3D intelligence, at 50, to imported information allows the system to interpret the physical boundaries that the system is to work within. M.E.P. information, received from others, may be schematics representing the desired path of service. Adding intelligence allows the system to interpret the flow of the service. M.E.P. Services can be Plumbing, Electrical conduit, Sprinkler or HVAC ductwork. Elements can be Pipes, Fittings, Ductwork, Equipment, etc. Any item used in the assembly of the service. In one embodiment, the system consists of a plurality of objects, comprising elements arranged in an assembly hierarchy. Each of the objects includes programming code that defines an interface and discrete internal functions that define its behavior. The objects, or elements, are compiled into a set of libraries, which are then loaded into the spatial database. When instantiated in the database the objects automatically display appropriate graphical representations from different viewpoints to produce two- and three-dimensional views of the resultant model. Additionally, when instantiated in the database, the interfaces of the objects is determined to enable them to pass data between one another. Their internal functionality allows them to execute core functionalities of the database and internal functions of other objects in the model. These functionalities may include immovable structural components, preexisting conduits, barriers, wall and floor interfaces. Each of these definitions provides routing information for additional mechanical system design features.

Auto engineering 60 is done by taking the outlet requirements of a space and determining the ducting or conduit size and the equipment requirements for the mechanical systems as well as determining a preliminary path of the services. The outlet requirements may be determined by architectural features such as but not limited to rooms size, doors and windows or may be determined by usage and occupancy requirements. The size and length of conduit parts and system elements is stored in a computer database.

By comparing at 70 the conduit elements and system elements to supplier cost databases cost estimates can be made. The cost estimates can be used for bidding jobs as well as for comparing to final job costs. Equipment information can be imported at 90 from manufacture's specification sheets into an Equipment Library 90 and thus stored for future use.

A virtual model of the system and the routing of the M.E.P. service is made at 80. This is done by following the schematic information, the required services throughout the building, or both. Further, the use of available elements can be optimized while giving priority to the most cost effective elements. The system resolves element conflicts by redirecting the service in the most efficient manner to avoid the conflicts. Recalling predrafted information from the equipment library 100 reduces the need for a user to draw system elements.

Text detail is added to the M.E.P. service drawings at 110. The text information includes, but is not limited to, sizes, lengths, dimensions from structural elements and elevations. This information may be retrieved from libraries created in previous steps of the method, may be added by a user, or both. Once the text detail has been added the M.E.P. service drawings are ready for submittal and approval to the structural engineer, architect and mechanical services engineer.

The M.E.P. service drawings may be returned with revised elements from any of the structural engineer, architect and mechanical services engineer. The structural engineer provides revised structural information 130 which describes changes to the physical conditions of the building's support structure since step 10. Revised architectural information 140 is provided by the architect and describes the physical conditions of the building's floors, walls, ceiling, partitions, lights, doors, etc. that has changed since step 20. The M.E.P. services information 150 may be changes made by the M.E.P engineer or may be equipment manufacturer specified by a client. This information is typically supplied in text form and is enhanced with 3-D intelligence for incorporation with revised M.E.P. service drawings.

The system scans virtual models at 170 for all M.E.P. services. The system then compares the physical make-up of each model and flags any potential conflicts created by the virtual routing of services. The system then highlights potential conflicts and potential solutions for assisting a user in determining a resolution. The user may select at 180 from the identified solutions or may create a different solution. The redirected service elements selected by the user are re-sketched by the system at 190 and related text detail is inserted.

The revised or coordinated individual M.E.P. service elements are created at 200. The service elements which may include but is not limited to duct sections, conduit sections, equipment interconnects, service equipment is outputted at 210. Service elements purchased from vendors may be automatically ordered from the output. Additionally, data for service elements in need of manufacture are sent to computer integrated manufacturing equipment. The manufacturing equipment includes, but is not limited to, plasma machines, coil lines, pipe cutting machines, etc. Once the service element has been manufactured a bar coding or other identification mark may be added for tracking product and shipment. This identification information may include delivery date and location information and/or serial assembly information to be matched to the M.E.P. services drawings for coordinated assembly onsite. Additional information and data may be company accounting software packages to track costs, schedules or other management data.

Although an illustrative embodiment has been shown and described, a wide range of modification, change, and substitution is contemplated in the foregoing disclosure and in some instances, some features of the embodiment may be employed without a corresponding use of other features. Accordingly, it is appropriate that the appended claims be construed broadly and in a manner consistent with the scope of the embodiment disclosed herein.

What is claimed is:

1. A computer-implemented method for automated design and modeling for a project comprising:
   storing size and capacity information associated with predefined objects of a mechanical system in a spatial database;
   identifying an existing physical building; and, subsequent to the identifying:
      entering into the spatial database parametric objects of the existing physical building wherein each of the parametric objects represents a design component of an object being modeled, wherein each of the parametric objects includes an interface through which the parametric object communicates information with other parametric objects;
      representing, via at least one of the parametric objects, one or more constraints to routing, placement or flow of the mechanical system in the existing physical building;

inputting, via an interface, project requirements for introducing the mechanical system to the existing physical building; and creating, based on at least the one or more constraints, an automated configuration of the mechanical system at least within the existing physical building.

2. The method of claim 1; wherein the entering into the spatial database is performed by at least one of an optical reader, a computer operator, or a computer file reader.

3. The method of claim 1; wherein at least one of the parametric objects defines a room.

4. The method of claim 3; wherein the at least one of the parametric objects contains data elements at least defining but not limited to one of: structural constraints, heating requirements, ventilation requirements, water requirements, electrical requirements or occupancy requirements for the room.

5. The method of claim 4; wherein the existing physical building comprises more than one parametric objects that each contains data elements at least defining but not limited to one of: structural constraints, heating requirements, ventilation requirements, water requirements, electrical requirements or occupancy requirements for the room.

6. The method of claim 5; wherein the parametric objects communicate the data elements to generate a load need for each of the data elements.

7. The method of claim 6; wherein the predefined objects of the spatial database include air-ducts, pipes, wires and other building mechanical system objects.

8. The method of claim 7; wherein the automated configuration generates a material list comprising the predefined objects in the spatial database, based on the size and capacity associated with the predefined objects and a load need generated from the data elements.

9. The method of claim 8; wherein the automated configuration outputs the material list to a computer automated manufacturing system and the computer automated manufacturing system creates a project inventory based on the material list.

10. The method of claim 9; wherein at least one of but not limited to the project inventory and material list is used by an accounting software to determine projected cost and budget for the project.

11. The method of claim 1; wherein the parametric objects define a community of buildings.

12. The method of claim 1; wherein the predefined objects of the spatial database include at least one of: furniture, fixtures, or utilities structures.

13. The method of claim 1; wherein the automated configuration outputs routing and material requirements for generating a cost estimate.

14. The method of claim 1; wherein the automated configuration generates a material list based on the predefined objects in the spatial database, the size and capacity associated with the predefined objects and a load need generated from at least one of: occupancy limits, interior or exterior walls or window size and placement.

15. The method of claim 14; wherein the automated configuration outputs routing and material requirements for generating a cost estimate.

16. The method of claim 15; wherein at least one of a project inventory or the material list is used by an accounting software to determine projected cost and budget for the project.

17. The method of claim 1, further comprising:
outputting the automated configuration of the mechanical system to at least one of a computer implemented manufacturing system, a project management system or an accounting system.

18. The method of claim 1, wherein the one or more constraints include one or more of: a physical condition of one or more parts of the existing physical building; an existing mechanical system in the existing physical building; architectural features of the existing physical building; or usage or occupancy requirements of the existing physical building.

19. The method of claim 1, wherein the creating comprises determining a conduit size for the mechanical system and a preliminary path of the mechanical system.

* * * * *